United States Patent [19]

Lindenbaum

[11] 3,945,491
[45] Mar. 23, 1976

[54] FOOLPROOF COIN AND KEY RETAINER

[76] Inventor: Ben Lindenbaum, 921 McLean Ave., Yonkers, New York, N.Y. 10704

[22] Filed: Nov. 19, 1973

[21] Appl. No.: 417,255

[52] U.S. Cl. .................. 206/.81; 150/34; 150/37; 206/.83; 206/.84; 215/100 R; 248/205 A; 248/310
[51] Int. Cl.$^2$ A45C 11/28; B65D 23/12; A45C 1/00
[58] Field of Search ............... 206/.8, .81, .82, .83, 206/.84, 38 K, 216; 211/13, 49, 126, 133; 248/362, 346.1, 362, 146, 316 D, 314, 310, 205 A; 150/37–41, 34, 35; 215/100.5, 101; 40/11 R, 23 R, 323, 324

[56] References Cited
UNITED STATES PATENTS

| | | | |
|---|---|---|---|
| 1,309,705 | 7/1919 | Suck | 40/11 R |
| 1,949,952 | 3/1934 | Bricham | 150/37 |
| 2,119,773 | 6/1938 | Buckner | 150/37 |
| 2,217,644 | 10/1940 | Conner | 220/23.4 |
| 2,796,068 | 6/1957 | Healy | 206/.81 |
| 2,954,120 | 9/1960 | Norcross | 206/.84 |
| 3,080,963 | 3/1963 | Rothgart | 206/.84 |
| 3,094,235 | 6/1963 | Luning | 215/100.5 |
| 3,138,244 | 6/1964 | White | 206/.81 |
| 3,262,478 | 7/1966 | Amsterdam | 150/37 |
| 3,425,538 | 2/1969 | Lott, Jr. | 206/.83 |

*Primary Examiner*—William Price
*Assistant Examiner*—Allan N. Shoap

[57] ABSTRACT

This invention relates to devices and means to retain, to hold or to grip securely coins, keys, jewerly and other such like items, and more particularly to hold coins in readiness for automobile drivers who must often pay highway and bridge tolls. The main embodiment of the present invention is to provide a pocket-like or a lip-like extruded section or clamping device, preferably made of resilient plastic or rubber. Various lengths of such an extruded section may then be glued or otherwise secured to strategic places to support quarters or dimes or half dollars near the driver's seat and within easy reach of the driver. Such extruded sections may be directly built or formed as an integral part of the inner body of the automobile itself in the process of manufacture or may be attached to the automobile's inner walls or upon the door frame near the stearing wheel or upon the dash-board of the car, or in the flooring space near the reach of the driver's hand so that the driver need only reach out to grasp the necessary coin, pull it effortlessly from its retainer and hand it over to the toll attendant.

1 Claim, 16 Drawing Figures

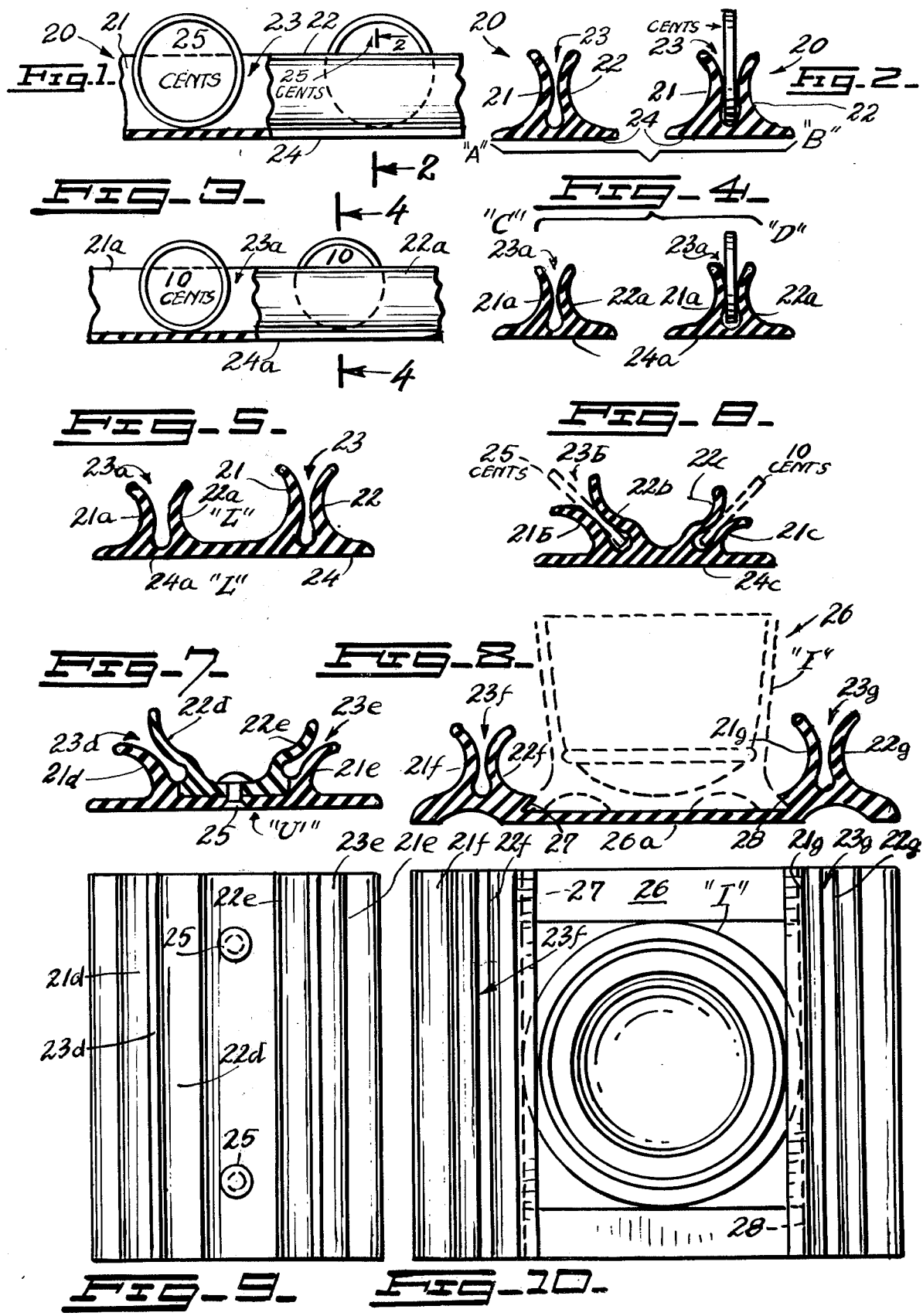

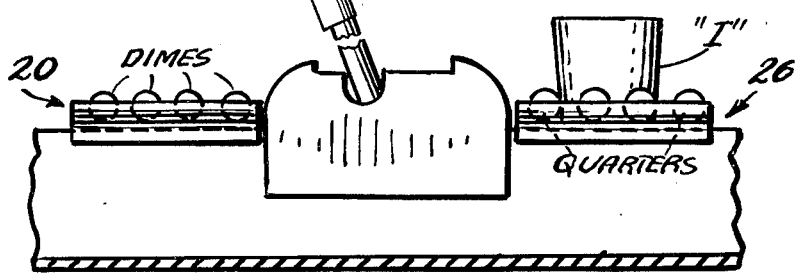
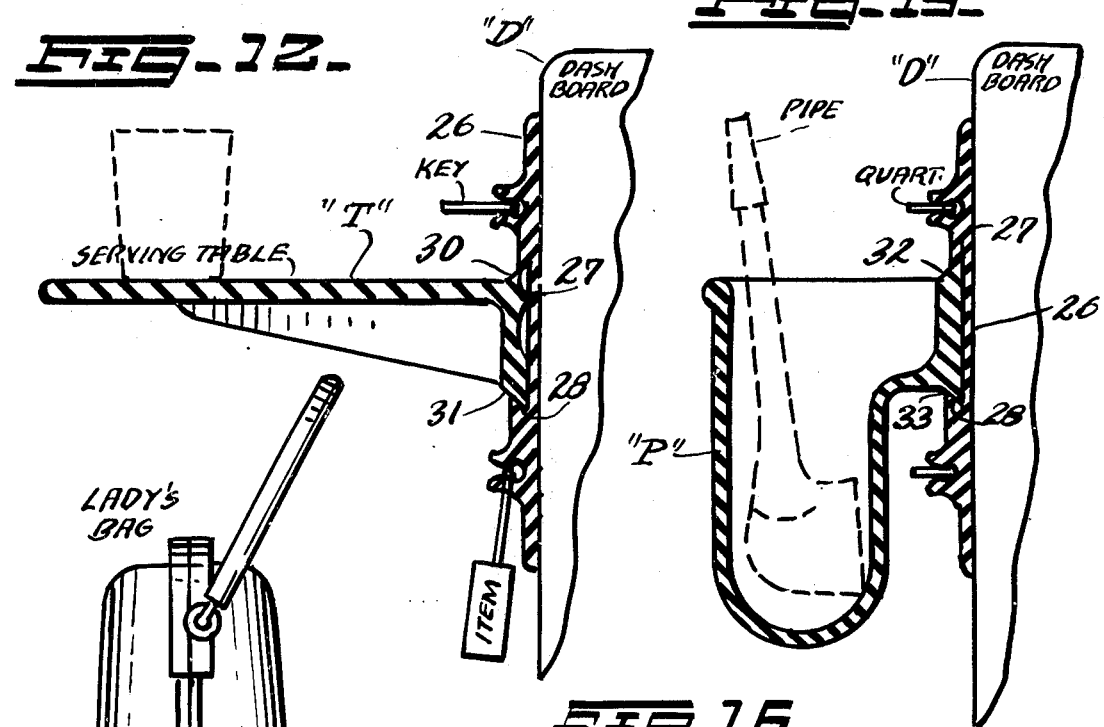
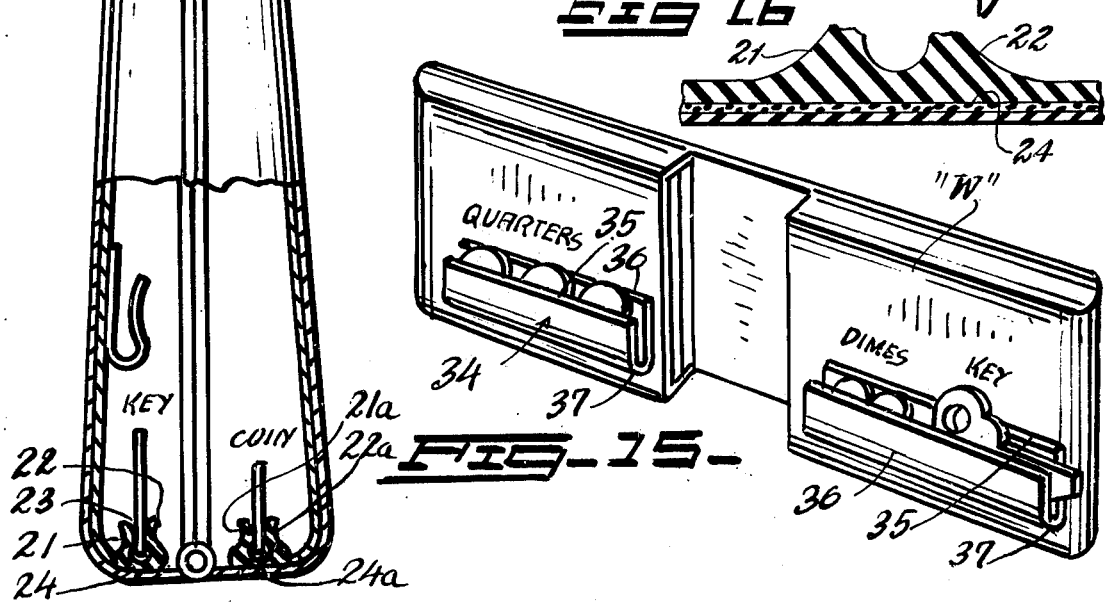

FOOLPROOF COIN AND KEY RETAINER

The present invention relates to such devices which may be readily utilized to support necessary small items such as coins, keys, jewerly and the like which due to their small size and normal use must be readily available or accessible to a person driving an automobile. Particularly this device may become extremely useful to support and to hold small change when passing through highway and bridge toll booths. By providing coins easily accessible to the driver he need not fumble through his pockets to search for change but can simply reach out and remove from the holding device the coins he needs for paying the tolls. In such manner passing through the toll gates safety is increased, the passage is speeded up. Quite often as the driver fumbles through his pockets in search for toll money he often inadvertantly may ride into a car just ahead of him in the toll booth. Other objects of the embodiment of this invention will appear as the description of this specification proceeds.

In its general configuration this invention provides for an extruded vinyl or rubber strip that may be used for holding coins, providing a convenience when paying tolls or parking meters. The device in question may be provided with a flattened under section or base which may be coated with a strip of cement or self applying glue so that the strip (in various lengths) depending on the requirements can be cemented in various readily accessible places within convenient reach or distance of the automobile driver. In the automobile there are accessible places such as the dashboard, the floor (near the driver), the ceiling (right above the driver's seat) and under the seat on which the driver sits and other places.

Furthermore this invention may find application inside a woman's handbag as a coin and key supporting holder, and can be also used in attache cases and in gentlemen's wallets.

Another object of an embodiment of this invention and its application may be in combination with other holding accessory means and devices. For instance such items may be pipe holders or small shelves or a table or a container that may be secured to the walls of the car or the dashboard to facilitate and to make items easily accessible to the car driver. For instance, the device for holding keys and coins can be provided with an additional surface or extension upon which may be secured and attached the aforesaid items as an accessory. This combination will be described later in greater detail as the specification proceeds.

Another object of this invention is to provide an extruded strip preferably made of or resilient plastic or rubber in the form of a lip having a flat base, said lip formed as an integral part of said base and located in a plane 90° rotated in its relationship to the lip section aforesaid.

An additional object of the embodiment of this invention is to provide an extruded vinyl section formed also of rubber which will provide an elongated slot into which coins such as dimes, quarters and half dollars may be readily inserted and held securily until needed.

Still another object of this invention is to provide a flat surface under said coin accessory which may contain a quantity of glue or rubber cement or some other type self-holding means to facilitate attaching or fasy- ening this device by hand to walls in a car, or in the home to facilitate fastening items to the strip which otherwise may be readily displaced.

This invention also contains certain other features of construction and the combination and arrangement of several parts to be hereinafter fully described and illustrated.

In describing the invention in detail, references will be made to the accompanying drawings where like character numerals denote like and corresponding parts throught the several views in which:

FIG. 1 is a side elevation of the coin holding extruded vinyl strip showing the embodiment of the present invention partially in section;

FIG. 2 is a section taken on the line 2—2 of FIG. 1, showing the configuration of the lip design for holding coins. In "A" the section is shown in its natural cross-section whilr at "B" in the manner in which it can support a coin such as a quarter;

FIG. 3 is a similar side elevational view shown in FIG. 2, but of smaller size destined to support coins of smaller denomination such as dimes and pennies. This view is also shown in partial cross-section broken away;

FIG. 4 is a section taken on the line 4—4 of FIG. 3 showing the cross-section of the extruded vinyl device. In FIG. 4 at "C" it is shown in its natural extruded configuration as it comes out from the extruding die and at "D" the strip is shown holding a penny or a dime.

FIG. 5 shows a combination of a section shown in FIGS. 1 and 2, 3, and 4, inclusive and particularly in FIGS. 2 and 4. The extruded vinyl strip instead of being extruded in individual lengths may be extruded from the extruding die combined and later cut or separated along the dotted line shown in FIG. 5;

FIG. 6 is a modification showing the vinyl strip combined (see FIG. 5) but in a substantially different configuration. In this case the lip coin holding device is formed not vertically (as in FIG. 5) but in a substantially inclined or angular position in its overall relationship to the base;

FIG. 7 shows an additional modification. In this case the device is formed of a pair of separately extruded sections; an upper and a lower section with separately extruded lip sections. The two separate sections by means of rivets or eylets may be held to one another substantially as illustrated to form the configuration shown in FIG. 6;

FIG. 8 shows an additional modification. In this embodiment there are two lip sections separated from one another by a substantial space which connects both sections to one another. The extruded strips on either side carry elongated V-shaped extrusions to help support various acessory items such as shown in dotted lines;

FIG. 9 is a plan elevational view of FIG. 7;

FIG. 10 is a plan elevational view of FIG. 8;

FIG. 11 shows the manner in which the vinyl extruded section may be secured by means of glue to the flooring of the car, near the driver's seat, adjacent to the gear-shift in the car.

FIG. 12 shows the manner the extruded section in FIG. 8 may be secured to the dash-board of the car to support a small utility table, in addition to the lip sections which will support keys, coins and the like;

FIG. 13 is similar to FIG. 12 indicating the manner in which the vinyl section shown in FIG. 8 will support a container or a pouch to hold a pipe and other items, handy, and close to the driver's seat;

FIG. 14 indicates the manner in which the vinyl strips shown in FIGS. 1 and 2, inclusive, may be mounted inside a lady's bag to support coins, keys and the like; an FIG. 15 shows the manner in which a U-shaped vinyl extruded section may be glued in short length directly upon the inner walls of a gentleman's wallet to support coins and keys; and FIG. 16 is an enlarged cross-section through the base of the extruded section to show the manner in which a thin layer of glue is applied thereto with a protective strip of paper lining.

Referring now more particularly to FIGS. 1 and 2, which show the embodiment of the present invention, it can be readily discerned that in their general configuration (see FIG. 1) the vinyl strip 20 may be provided with a pair of vertically curved extensions 21 and 22, respectively, facing one another and forming between the two a narrow arcuate space 24. Both vertical sections 21 and 22 are extruded as an integral part of the base 24 which is substantially flat. Upon the base 24 may be applied glue or cement (not shown) to facilitate mounting the strip 20 to various wall inside a conventional type car and in the home.

From FIGS. 3 and 4, it can be readily discerned that they are similar in their overall configuration (like FIGS. 1, and 2) and only differ in relative size. The extruded vinyl section shown in FIGS. 1, and 2, is largely intended to support larger coins (like quarters and half dollars) while the lower strip (in FIGS. 3, and 4) is substantially smaller to support dimes, nickels and pennies. The vinyl strip in FIGS. 3, and 4 is comprised of the pair of vertically curved extensions 21a and 22a, to form a slot 23a and being provided with a substantially flat mounting base 24a.

FIG. 5 shows a combination formed of the two aforesaid figures. In other words the extruded vinyl sections in FIGS. 1, and 2 are combined with the vinyl extrusion shown in FIGS. 3 and 4, inclusive, to form the section shown in FIG. 5. Because of this conbimation the same index numerals will here apply. The vinyl strip shown in FIG. 5 can be split later into two separate strips by means of a rotating disk knife (not shown) along the dotted line "L" shown in FIG. 5, so as to form two separate strips substantially as shown in FIGS. 2 and 4, inclusive.

Refering now to FIG. 6 (which is a modification) it can be readily discerned that this is simply a different configuration of the same vinyl strip. In this embodiment the holding strip shown in FIGS. 2, and 4, is mounted in an inclined section or position relative to its flat base. In general, however, this vinyl strp consists of the vertical section 21b and 22b forming an arcuate slot 23b, and the vertical sections 21c and 22c forming the arcuate slot 23c. Both strips are mounted side by side upon the common mounting base 24b.

Refering now to FIG. 7, it can be discerned that this extruded strip section very much resembles the one already shown in FIG. 6. However, it is now formed of two entirely separate sections, an upper section "U" and an under section "U'". The upper section "U" may be formed with the inclined extensions 21d and 22d, forming an arcuate slot 23d, and the extensions 21e and 22e forming an arcuate slot 23e. Both sections "U" and "U'" are secured to one another by means of rivets or the eylets 25, substantially as indicated.

FIG. 8 is made of arcute shaped members or lips 21f and 22f to form the arcuate slot 23f on one side, and on the opposite side, are another pair of lips 21g and 22g to form the arcuate slot 23g. Both sides of the flexible or resilient base forming strip herein described are connected to one another by means of the flat strip portion or bridge-like connection 26a. On either side of the two strips there are provided a pair of V-shaped extrusions or channels 27 and 28, respectively which serve to support various utility items substantially as illustrated.

A cursory study of FIG. 10 indicates that this is a plan elevational view of FIG. 8 showing substantially all the details of FIG. 8 including the manner in which an item marked "I" may be secured within the space formed by the two parallel lips being connected by the connecting bridge 26. The lips 23f and 26g have already been described above in detail, and need no further description here.

Refering more particularly to FIG. 11, there is shown the manner in which a pair of strips 20 (described in FIGS. 1 to 4, inclusive) and the strip 26 (described in FIGS. 8 to 10, inclusive) may be mounted by means of permanent glue or cement to the gear shif housing in the automobile in close proximity to the driver's seat.

In FIG. 12 there is shown the manner in which the strip 26 may be secured by means of glue to the vertical wall of the dash-board "D" in the automobile to support within its V-shaped sections 27 and 28, respectively, a small plastic (or metal) utility table "T." The table "T" may be provided with V-shaped extensions 30 and 31 which fit snugly within the slots or channels 27 and 28 in the base forming strip 26.

FIG. 13 shows the manner in which the strip 26 may be secured to the dash board "D" of the automobile to support a pouch or a container (made of plastic or metal) by means of a pair of V-shaped extensions 32 and 33 which slide within the V-shaped channels 27 and 28 in the strip 26 substantially as indicated.

FIG. 14 shows in detail the manner in which the vinyl strip shown in FIGS. 1, to 4, inclusive may be secured to the bottom section of a lady's bag to support coins and keys. The index numerals in FIG. 14 read on the index numerals in FIGS. 1 to 4, inclusive.

Refering to the gentleman's wallet shown in FIG. 15, it can be readily discerned that the lip supporting device 34 in this case may consist of a pair of vertical lip sections 35 and 36 so as to form the U-shaped body connected by the arcuate bridge section 37 to form the U-shaped body above referred to. The strips 34 are secured to the wallet by means of glue or cement upon the inner walls "W" of the wallet during the process of manufacture of they can be individually and manually secured thereto as an accessory by the owner of the wallet.

A careful examination of the foregoing description in conjunction with the invention as illustrated in the drawings, will enable the reader to obtain a clear understanding of the features of merit and novelty, sufficient to clarify the construction of the invention as hereinafter claimed.

Various changes in size, shape, and materials may be resorted to without departing from the spirit and scope of the invention as defined by the appended claim.

Having described my invention what I claim as new and novel is the following:

1. An article support comprising a strip of resilient material forming a base, a first and second pair of resilient arcuate-shaped members attached to said base and each forming a slot for receiving coins, a pair of spaced V-shaped parallel channels formed in the base and separated by a flat strip portion, each pair of arcuate- shaped members being parallel to the channels and located on the outer boundaries thereof.

* * * * *